United States Patent
Juliano et al.

[15] 3,653,180
[45] Apr. 4, 1972

[54] BLOCK COPOLYMER MEMBRANE FOR SEPARATING POLAR CONTAMINANTS FROM GASEOUS MIXTURES

[72] Inventors: Peter C. Juliano, Scotia; William J. Ward, III, Schenectady, both of N.Y.

[73] Assignee: General Electric Company

[22] Filed: Nov. 2, 1970

[21] Appl. No.: 86,289

[52] U.S. Cl....................................................55/16, 55/158
[51] Int. Cl.........................................................B01d 53/22
[58] Field of Search..................55/16, 158; 210/23, 321, 500

[56] References Cited
UNITED STATES PATENTS

| | | | |
|---|---|---|---|
| 3,350,844 | 11/1967 | Robb | 55/16 |
| 3,256,675 | 6/1966 | Robb | 55/16 |
| 3,396,510 | 8/1968 | Ward | 55/16 |

*Primary Examiner*—John Adee
*Attorney*—Richard R. Brainard, Paul A. Frank, Charles T. Watts, Leo I. Malossi, Frank L. Neuhauser, Oscar B. Waddell and Joseph B. Forman

[57] ABSTRACT

Block copolymers containing poly(oxyethylene) segments are used for the preparation of permselective membranes employed in separating polar gases from non-polar gases. Such copolymers containing poly(oxyethylene) glycol carbonate segments in polycarbonate chains are described.

14 Claims, No Drawings

BLOCK COPOLYMER MEMBRANE FOR SEPARATING POLAR CONTAMINANTS FROM GASEOUS MIXTURES

BACKGROUND OF THE INVENTION

The preparation of poly(oxyethylene) block copolymers wherein units making up the copolymer are arranged in alternating sequences and both types of unit structures are polymeric has been described in the literature, e.g., "Elastomeric Polycarbonate Block Copolymers" [E. P. Goldberg, J. Polymer Sci. C., 4, 707 (1963)]; "Elastomers Based on Polycyclic Bisphenol Polycarbonates" [K. P. Perry et al, J. Appl. Polymer Sci., 9, 3451 (1965)]; "Water and Salt Transport Properties of Membranes Based on Ethylene Oxide-Containing Block Copolymers" [T. W. Brooks et al. ACS Polymer Preprints, 10(2), 1174 (1969)]; and "Block Copolymer from Dihydroxyl Polystyrene and Polyethylene Glycol" [Y. Shimura et al, J. Polymer Sci. A-1, 8, 2,171 (1970)].

In addition, the preparation of elastomeric poly(oxyethylene)-polycarbonate block copolymers has been described in U.S. Pat. No. 3,161,615—Goldberg. Block copolymers containing poly(oxyethylene) segments in other configurations (not strictly in alternating sequence) have also been described in "Block Polymers of Ethylene Oxide and Its Analogues with Styrene" [Richards et al, Trans. Faraday Soc., 55, 1,644 (1959)] and an article by A. Skoulios et al. [Compt. Rend., 251, 730 (1960(].

By the techniques described in the above-mentioned articles and patent (all are incorporated by reference) flexible, polar, block segments are incorporated into a rigid, linear polymer chain, e.g., polycarbonate, polyester or polystyrene. Most of the work described in the Goldberg article utilizes poly(bisphenol-A carbonate) and various polyether glycols such as poly(oxyethylene), poly(oxyethylene-oxypropylene), poly(oxypropylene), poly(oxybutylene) and poly(oxystyrene). The poly(oxyethylene) systems were investigated in greatest detail to determine both the effect upon the properties of the resulting block copolymer of utilizing starting polymeric glycol material of different molecular weights (1,000–20,000) and of varying the copolymer composition (5–70 wt. % glycol). The linear polycarbonate chain for these resins contains structural units of bisphenol-A carbonate (I) and poly(oxyethylene) glycol carbonate (II).

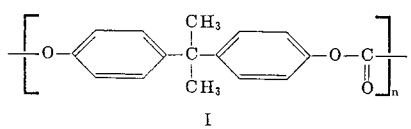

I

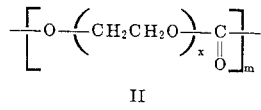

II

The value of $x$ is predetermined by the choice of the glycol molecular weight. The average repeat sequence of units as indicated by $n$ and $m$, is dependent upon the mole ratio of I, II and may be readily calculated.

The fact that true block copolymers resulted rather than merely the information of a polymer mixture was determined by the conduct of compatibility studies. Thus, films were cast from various solutions consisting of mixtures of bisphenol-A carbonate homopolymer and poly(oxyethylene) glycol in chloroform. These films were found to be rough, milky, and very weak. Similar indications of incompatibility were obtained by casting films prepared from mixtures of poly(bisphenol-A carbonate) and poly(oxyethylene) carbonate polymer.

These copolymers are indicated in the Goldberg article as having an ordered structure with no crystallinity attributable to the poly(oxyethylene) glycol carbonate segments even though poly(oxyethylene) glycols themselves are highly crystalline polymers.

Numerous polymeric aliphatic material having hydroxyl groups are useful for forming resinous copolymers with polycarbonate or polystyrene resins. Polyethers, polyesters, polyurethanes and polyacetals are exemplary of such polymeric aliphatic materials.

SUMMARY OF THE INVENTION

This invention is directed to the utilization of non-porous block copolymer thermoplastic elastomer membranes wherein flexible, polar poly(oxyethylene) block segments are incorporated into rigid, linear polymer chains for the separation of polar gases from non-polar gases. Block copolymers employed containing poly(oxyethylene) glycol carbonate segments in polycarbonate chains are described.

DESCRIPTION OF THE PREFERRED EMBODIMENT

Among the atmospheric pollutants, which are of concern today because of their harmful effect on plant and animal life even at very small concentrations are included a number of highly polar materials, e.g., $SO_2$, $NO_2$, $H_2S$, $NH_3$, $SO_3$ and acetaldehyde.

For purposes of this invention a gas (or vapor) is considered to be "polar" when there is a significant difference in electronegativity between any two species of atoms in the molecules of the gas (or vapor). Thus, for purposes of this definition $CO_2$ is not considered polar while $SO_2$ is considered strongly polar.

Thus, it is essential to be able to measure the amounts of these materials present in the atmosphere. A desired step in detecting such gaseous materials is that of obtaining a substantial enrichment of the pollutant in the detecting mechanism. The gas analyzer system disclosed in U.S. Pat. No. 3,429,105—Llewellyn et al. (incorporated by reference) is representative of devices which may employ the non-porous membranes of this invention for providing single or multiple enrichment of selected gases to a gas analyzer. It is preferable that the concentration of the atmospheric pollutants being detected be enriched by a factor of at least 200 over the concentrations encountered in the atmosphere.

The requirements of the membrane are that it shall be chemically inert, non-volatile (if an immobilized liquid is used), have a high permeability (e.g. greater than $100 \times 10^{-9} \left( \dfrac{\text{cc. gas (STP), thick}}{\text{sec, cm.}^2,\ \text{cm. Hg}\Delta P} \right)$ for the polar contaminants of interest and a separation factor over air (or nitrogen) of at least about 200.

It has been discovered that block copolymer membranes as described hereinabove display an excellent selectivity value for the separation of sulfur dioxide from nitrogen (or air) and, further display very useful permeability and separation factors relative to air (or nitrogen) for ammonia, sulfur dioxide and $NO_2$. The block copolymer membranes retaining the above capabilities at room temperature (23° C.) are those of primary interest.

EXAMPLE 1

An alternating block copolymer was prepared by a modification of the technique described in the aforementioned Goldberg article. In this modified procedure, Bisphenol-A (9.12 gm.) and poly(oxyethylene) glycol (10 gm.) having a molecular weight of 1000 were heated in 100 cc. of benzene to reflux under a nitrogen atmosphere. Any low molecular weight, monofunctional alcohols present in the poly(oxethylene) glycol or water in the benzene were azeotroped out of the reaction mixture into a Dean-Stark Trap. After the reaction mixture had cooled to room temperature, dry methylene chloride (100 cc.) and pyridine (30 cc.) were added. Phosgene was then added at a rate such that the temperature was kept below 30° C. The polymer was subjected to several isopropanol precipitations from methylene chloride followed by drying for three hours at 60° C. in a vacuum oven, then overnight at room temperature.

The resulting block copolymer was cast from methylene chloride solution into optically clear films. These films can be easily handled when wet (e.g. with water) but must be supported when dried. This block copolymer was found to have a poly(bisphenol-A carbonate) content of 55.9 percent by weight (integrated areas from a nuclear magnetic resonance spectrum [NMR]) and an intrinsic viscosity of 0.58 in dioxane at 30° C. The $SO_2$ permeability and the separation factor ($SO_2/N_2$) for the block copolymer membrane was compared to other membrane constructions and the results are set forth in Table I.

The polyethylene glycol (liquid) was utilized as an immobilized liquid membrane and the results for the silicone rubber tests resulted from a three-stage separation procedure.

TABLE I

| Membrane Material | $SO_2$-Permeability cc. gas (STP), cm. thick Sec., cm.², cm. Hg$\triangle$P | Selectivity, $SO_2/N_2$ |
| --- | --- | --- |
| Block copolymer | 354 | 3,750/1 |
| Polyethylene glycol (m.w. 600) (Immobilized liquid membrane) | ~1,000 | ~4,000/1 |
| Silicone rubber (Three-stage) | 1,500 | 1,000/1 |

It can be seen that the block copolymer has the same selectivity separation factor for $SO_2/N_2$ as the polyethylene glycol immobilized liquid membrane. The permeability of $SO_2$ through the block copolymer is substantially less than the permeability in the other membrane materials. However, because of the high strength of the block copolymer when wet much thinner membranes can be prepared and this reduction in thickness serves to increase the $SO_2$ permeability. Similarly, other compositions and block lengths may be prepared to optimize the physical (e.g. permeability) and chemical characteristics of the membrane.

EXAMPLE 2

A second block copolymer was prepared using the same materials and the same procedure as outlined hereinabove except that 20 gm. of polyethylene oxide, 11.8 gm. of Bisphenol-A, 100 cc. of benzene, 250 cc. of methylene chloride and 45 cc. of pyridine were employed to make the final poly(oxyethylene) glycol carbonate content 55 percent by weight as determined by NMR. The intrinsic viscosity of this block copolymer was found to be 0.32 in dioxane at 30 ° C. The resulting block copolymer displayed an increase in permeability as compared to the block copolymer of Example 1. A comparison of the block copolymer of Example 2 (Batch No. 2) and the earlier described block copolymer of Example 1 (Batch No. 1) is set forth in Table II below.

TABLE II

Permeability $\left(\dfrac{\text{cc. (STP), cm. thick}}{\text{sec.cm.}^2, \text{cm. Hg}\triangle P}\right) \times 10^9$

| Gas: | Batch #1 | Batch #2 |
| --- | --- | --- |
| $N_2$ | 0.0945 | 0.165 |
| CO | | .322 |
| $CH_4$ | | .433 |
| $O_2$ | | .463 |
| He | | 1.28 |
| $H_2$ | | 1.71 |
| $CO_2$ | 4.83 | 9.27 |
| $NH_3$ | | 67 |
| $SO_2$ | 354 | 410 |
| $NO_2$ | 193 | 500-900 |
| $H_2S$ | (¹) | |

¹ Degraded membrane.

The degradation of the membrane by contact with highly concentrated $H_2S$ results from attack by this gas on the carbonate moieties of the poly(oxyethylene) glycol carbonate structural units. Use of different (non-carbonate) agents to link the poly(oxyethylene) units to the rigid linear structural units should obviate this problem. By separate test it was determined that the above block copolymers are attacked by oxygen in the presence of light, but oxygen in the absence of light does not affect these membrane materials.

The very small values for permeability established for the membranes of Example 2 with respect to CO, $Ch_4$, $O_2$, He and $H_2$ which are considered non-polar gases, confirms the selectivity of the block copolymers as between polar and non-polar gases.

Block copolymer membranes for gas separation require mounting on backing membranes of other materials, because of their lack of structural integrity when dry. Thus, in preparing block copolymer membranes the following procedure is followed:

a. the block copolymer is dissolved in a solvent (e.g. chloroform) to make a 10 percent (10 gm./100 cc.) of solvent solution;

b. the above solution is cast on a clean surface (e.g. a glass plate) with a doctor blade adjusted to have a 10-mil space between the blade and the glass;

c. when the solvent has evaporated from the cast film, the surface with the film disposed thereon is immersed in some liquid (e.g. water) in which the film is insoluble and which will cause the film to release from the surface in a few minutes;

d. the thin copolymer film is picked up and spread over a suitable backing membrane, such as 1-mil thick silicone rubber film, and permitted to dry. When a suitable backing material is selected, the resulting composite membrane structure is one in which the block copolymer film is tightly adhered directly to the backing membrane and cannot be removed.

Requirements for the selection of a suitable backing material are that it shall be microporous or non-porous, that its resistance to gas permeation be small compared to the resistance of the block copolymer film and that it be chemically resistant to the gases and vapors with which it will come into contact in significant quantities. The following materials have been found suitable as backing materials for block copolymer films: silicone rubber, asymmetric polyxylylene oxide in 1-micron effective thickness and porous polypropylene. The asymmetric polyxylylene oxide is described in U.S. application Ser. No. 36,923—Kimura (incorporated by reference) filed May 13, 1970 and assigned to the assignee of the instant invention.

Attempts have been made to support the membrane on a filter material sold under the trademark "solvinert". This material appears to be a terpolymer of polyvinyl alcohol, polyvinyl chloride and polyvinyl acetate. All attempts to support block copolymer membranes on this backing material have been unsuccessful.

In the practice of this invention utilizing various rigid, linear polymer chain materials the content of poly(oxyethylene) segments should be in the range of from 30–95 weight per cent of the block copolymer to preferably provide a rubbery membrane material.

Materials other than polycarbonates that are useful as the rigid, linear polymers in the practice of this invention are, for example, polyesters, polystrene and polyurethanes.

What we claim as new and desire to secure by Letters Patent of the United States is:

1. In an apparatus for the preferential removal of a given gaseous component from a mixture of gases, the apparatus comprising a chamber, a portion of the wall area of the chamber being a non-porous permeable membrane, means in communication with the chamber for conducting the mixture of gases thereto into contact with the inner side of the permeable membrane and means for removing from the outer side of the permeable membrane a gas mixture rich in said given gaseous component, the improvement comprising:

a. the non-porous membrane being made of a block copolymer material in which at least one poly(oxyethylene) segment is arranged in combination with a plurality of rigid, linear polymer segments and the poly(oxyethylene) content is in the range of from 30-95 weight per cent of the block copolymer.

2. The improvement of claim 1 wherein the poly(oxyethylene) segments are present as structural units of poly(oxyethylene) glycol carbonate and the rigid linear polymer segments are structural units of bisphenol-A carbonate.

3. The improvement of claim 1 wherein the block copolymer is permanently bonded directly to a flexible support layer.

4. The improvement of claim 3 wherein the flexible support layer is porous.

5. The improvement of claim 4 wherein the porous flexible support layer is asymmetric polyxylylene oxide.

6. The improvement of claim 4 wherein the porous flexible support layer is porous polypropylene.

7. The improvement of claim 3 wherein the flexible support layer is non-porous.

8. The improvement of claim 7 wherein the non-porous flexible support layer is silicon rubber.

9. The improvement of claim 1 wherein the rigid linear polymer material from which the rigid linear polymer segments are derived is selected from the group consisting of polycarbonate, polyesters, polystyrene and polyurethanes.

10. The improvement of claim 1 wherein the block copolymer membrane has a separation factor for polar contaminants over nitrogen of at least about 200.

11. The improvement of claim 10 wherein the block copolymer membrane has a permeability in excess of $100 \times 10^{-9} \dfrac{\text{cc. gas (STP), cm. thick}}{\text{sec., cm.}^2, \text{cm. Hg} \Delta P}$ 12. In a method for the separation of a given gas from a mixture of gases by the bringing of the mixture into contact with one side of a non-porous permselective film under a partial pressure differential in said given gas across said film, the improvement comprising:
  a. employing a membrane made of block copolymer material as the permselective film, said material being one in which at least one poly(oxyethylene) segment is arranged in combination with a plurality of rigid, linear polymer segments and the poly(oxyethylene) content is in the range of from 30–95 weight per cent of the block copolymer and
  b. mixture containing at least one polar gas or vapor to be separated therefrom at least in part.

13. The improvement of claim 12 wherein the polar gas or vapor content of the mixture is selected from the group consisting of $NH_3$, $SO_2$, $H_2S$, $NO_2$, $SO_3$ and acetaldehyde.

14. The improvement of claim 12 wherein the poly(oxyethylene) segments of the block copolymer material are present as structural units of poly(oxyethylene) glycol carbonate, the rigid linear polymer segments are structural units of bisphenol-A carbonate and the polar gas is selected from the group consisting of $NH_3$, $SO_2$ and $NO_2$.

* * * * *